Figure 1:
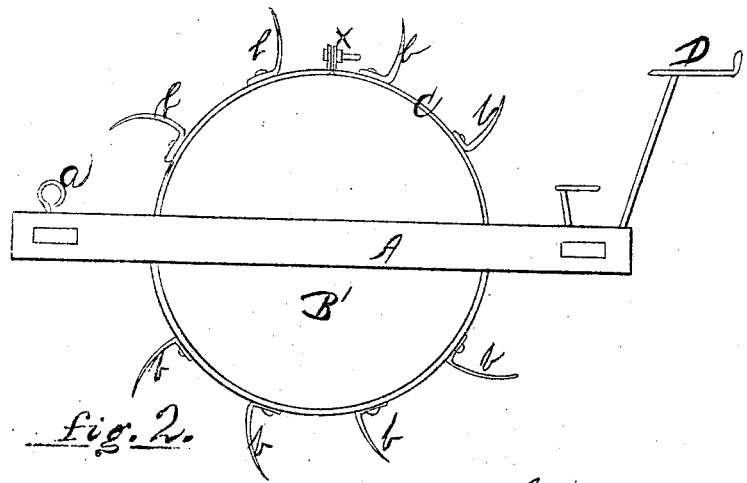
Figure 2:
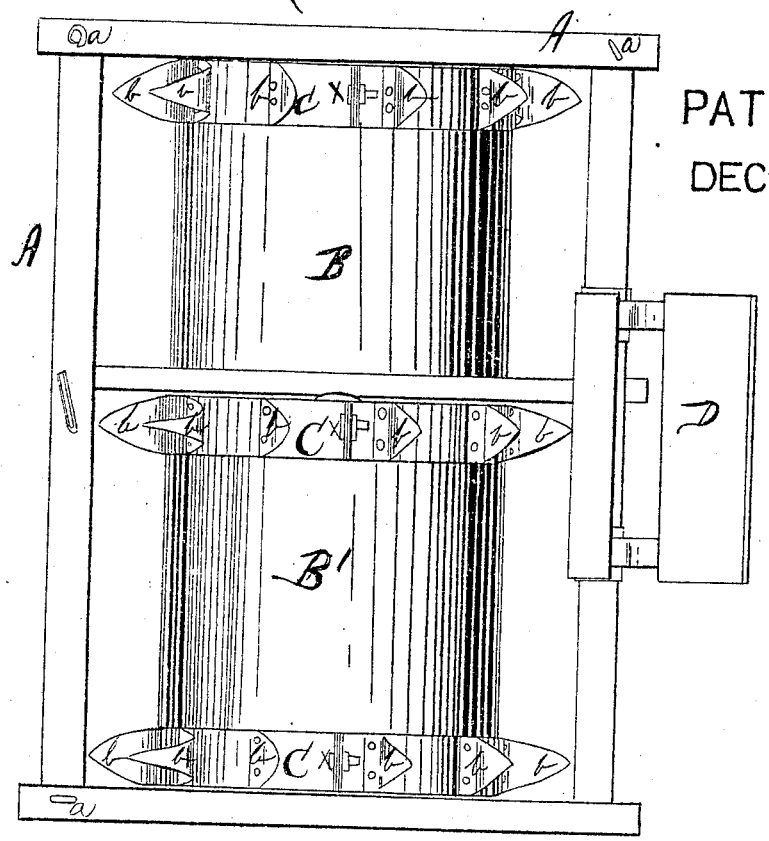

William S. Worley's
Impt in Land Rollers.

72438

PATENTED
DEC 17 1867

United States Patent Office.

WILLIAM S. WORLEY, OF TUSCOLIA, ILLINOIS.

Letters Patent No. 72,438, dated December 17, 1867.

IMPROVEMENT IN LAND-ROLLERS.

The Schedule referred to in these Letters Patent and making part of the same.

TO ALL WHOM IT MAY CONCERN:

Be it known that I, WILLIAM S. WORLEY, of Tuscolia, in the county of Douglas, and in the State of Illinois, have invented certain new and useful Improvements in Land-Roller; and do hereby declare that the following is a full, clear, and exact description thereof, reference being had to the accompanying drawings, and to the letters of reference marked thereon, making a part of this specification.

In the annexed drawings, A represents a frame, made in the form of an oblong square, between which the rollers B B' are supported by means of suitable axles. These rollers, B B', are of the ordinary construction and material. The roller B' is somewhat longer than the roller B, and is provided with a metallic band, C, at each end, the said bands being connected to the roller by means of a bolt and nut, $x$, so that it can readily be extracted therefrom whenever desired. Riveted to these bands is a series of small shovels, $b\ b$, placed at equal distances from each other around the entire circumference of the roller. The roller B has a band, C, and series of shovels, $b$, upon its outer end, similar to those upon roller B'. The object of these shovels is to form openings in the ground for the insertion of the seed, while the ground is being levelled by the rollers, at the one operation.

Upon the rear of the frame A is a suitable seat, D, for the driver, while upon the forward part of said frame are to be connected the thills or pole for attaching the horses.

The frame A is made adjustable by allowing the side pieces to pass into mortises in the end pieces, where they are connected by pins, $a\ a$, so that, by withdrawing said pins, the frame may be taken apart.

In the use of this invention, the ground is laid off and rolled at one operation; or the bands with the shovels can be taken off, and the land levelled, as preferred.

Having thus fully described my invention, what I claim as new, and desire to secure by Letters Patent, is—

The rollers B B' provided with the bands C C C and shovels $b\ b$, when arranged upon the frame A in the manner and operating substantially as and for the purposes herein specified.

In testimony that I claim the foregoing, I have hereunto set my hand, this 13th day of July, 1867.

WILLIAM S. WORLEY.

Witnesses:
 W. H. LAMB,
 JOHN BROWN